(12) United States Patent
Chen et al.

(10) Patent No.: US 12,083,608 B2
(45) Date of Patent: Sep. 10, 2024

(54) STEEL PLATE DOUBLE-PRE-STACKING SYSTEM FOR SINGLE SHEAR LINE, AND STACKING METHOD THEREOF

(71) Applicant: BAOSTEEL ZHANJIANG IRON & STEEL CO., LTD., Zhanjiang (CN)

(72) Inventors: Xiaojun Chen, Zhanjiang (CN); Bin Liu, Zhanjiang (CN); Yang Xie, Zhanjiang (CN); Yusheng Cao, Zhanjiang (CN)

(73) Assignee: BAOSTEEL ZHANJIANG IRON & STEEL CO., LTD., Zhanjiang (CN)

( * ) Notice: Subject to any disclaimer, the term of this patent is extended or adjusted under 35 U.S.C. 154(b) by 133 days.

(21) Appl. No.: 17/764,056

(22) PCT Filed: Sep. 29, 2020

(86) PCT No.: PCT/CN2020/118926
§ 371 (c)(1),
(2) Date: Mar. 25, 2022

(87) PCT Pub. No.: WO2021/063363
PCT Pub. Date: Apr. 8, 2021

(65) Prior Publication Data
US 2022/0314347 A1      Oct. 6, 2022

(30) Foreign Application Priority Data

Sep. 30, 2019   (CN) .......................... 201910942656.8

(51) Int. Cl.
*B23D 31/02*     (2006.01)
*B21D 43/22*     (2006.01)
(Continued)

(52) U.S. Cl.
CPC ............. *B23D 31/02* (2013.01); *B21D 43/22* (2013.01); *B23D 36/0083* (2013.01); *B41J 3/413* (2013.01)

(58) Field of Classification Search
CPC ................ Y10T 83/4656; B23D 31/02; B23D 36/0083; B23D 36/0091; B23D 36/00; B23D 36/0033; B21D 43/22; B41J 3/43
See application file for complete search history.

(56) References Cited

U.S. PATENT DOCUMENTS

| | | | | |
|---|---|---|---|---|
| 2003/0192412 | A1* | 10/2003 | Otto | B23D 59/001 83/13 |
| 2013/0184133 | A1* | 7/2013 | Sugimoto | B65H 29/62 493/29 |
| 2018/0200768 | A1* | 7/2018 | Xiong | B23D 15/06 |

FOREIGN PATENT DOCUMENTS

| | | |
|---|---|---|
| CN | 201470675 U | 5/2010 |
| CN | 102974612 A | 3/2013 |
| CN | 209334440 U | 9/2019 |

OTHER PUBLICATIONS

English translation of the JP Office Action for the corresponding JP application.

(Continued)

*Primary Examiner* — Phong H Nguyen
(74) *Attorney, Agent, or Firm* — Lei Fang, Esq.; Smith Tempel Blaha LLC

(57) ABSTRACT

A dual pre-stacking system of steel plates for a single cutting line and a stacking method therefor. The dual pre-stacking system comprises: a cooling bed inspection stand, a crop shear with a cut-to-length function, a bilateral shear, 1#inkjet printer, a front pre-stacker, a cut-to-length shear, a length and thickness gauge, 2#inkjet printer, surface check/size inspection and fitting, and a rear pre-stacker arranged in order along the roller. The dual pre-stacking system and the (Continued)

stacking method therefor of the present invention solves the problem that the inkjet printing, size fitting and pre-stacking in the later zone of the cutting line are slow when producing steel plates with high magnification, simultaneously performs pre-stacking operation after bilateral cutting and surface check in one cutting line, achieves synchronous inkjet printing/imprinting, size fitting and pre-stacking of the steel plates at two sites along the cutting line.

2 Claims, 1 Drawing Sheet

(51) Int. Cl.
  *B23D 36/00* (2006.01)
  *B41J 3/413* (2006.01)

(56) References Cited

OTHER PUBLICATIONS

English translation of the International Written Opinion for PCT/CN2020/118926 dated Dec. 29, 2020.
English translation of the Abstract of Thesis for the Degree of Master in Computer Technology by Cao Yusheng, Jun. 2011.
Lu article with English translation.
English translation of the Abstract of Thesis submitted to Shanghai Jiao Tong University for the Degree of Engineering Master by Cui Hengxin.

* cited by examiner

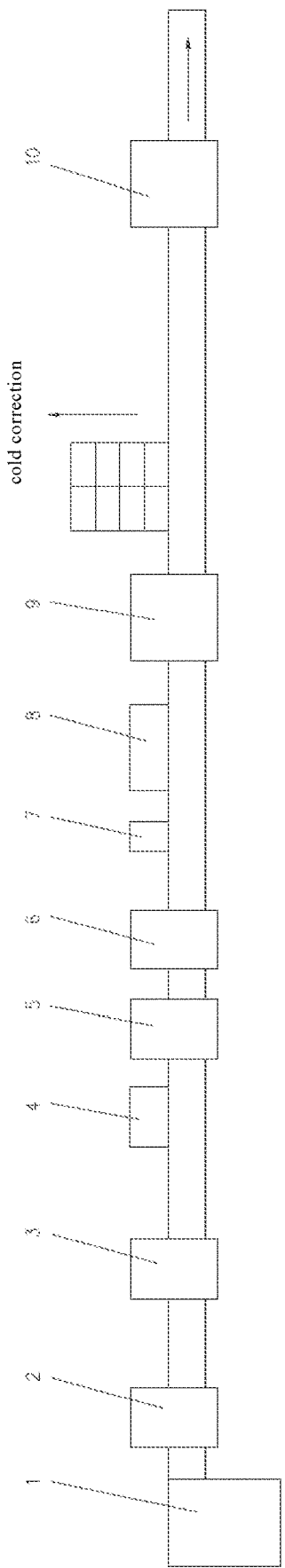

STEEL PLATE DOUBLE-PRE-STACKING SYSTEM FOR SINGLE SHEAR LINE, AND STACKING METHOD THEREOF

CROSS-REFERENCE TO RELATED APPLICATIONS

This application is a 371 U.S. National Phase of PCT International Application No. PCT/CN2020/118926 filed on Sep. 29, 2020, which claims benefit and priority to Chinese patent application No. CN 201910942656.8 filed on Sep. 30, 2019, the content of both are incorporated by reference herein in their entires.

TECHNICAL FIELD

The present invention relates to technology for cutting and stacking a slab, particularly to a dual pre-stacking system of steel plates for a single cutting line and a stacking method therefor.

BACKGROUND ART

Up to the present, a traditional process arrangement for a cutting line of a heavy plate production line uses the following operation procedure: head and tail end cutting and segmentation by crop shear; bilateral shear cutting; cut-to-length shear cutting (to steel plate contract length); inkjet printing/imprinting; surface check/size fitting; and, pre-stacking and warehousing. However, when sub-plate number of a big plate in a cutting line is over 5 (magnification 5), there are bottlenecks in inkjet printing/imprinting, size fitting and pre-stacking in a later zone, causing an empty capacity in cutting with crop shear, bilateral shear, or cut-to-length shear and so on.

The process arrangement for the traditional operation of the cutting line has the following problems:

The traditional manufacturing manners for cutting, size fitting and pre-stacking have a low efficiency, and when manufacturing a steel plate for many sub-plates, there can be a severe blockage in an inkjet printer, and regions of surface check/size inspection and pre-stacking, especially empty capacity in cutting with crop shear, bilateral shear, or cut-to-length shear in the case of the steel plate with high cutting magnification.

SUMMARY

The object of the present invention is to provide a dual pre-stacking system for steel plates for a single cutting line and a stacking method therefor, which solves the problem that the inkjet printing/imprinting, size fitting and pre-stacking in the later zone of the cutting line are slow when producing steel plates with high magnification, performs simultaneous pre-stacking operation after bilateral cutting and surface check in one cutting line, achieves synchronous inkjet printing/imprinting, size fitting and pre-stacking of the steel plates at two sites along the cutting line, and improves production rate of the cutting line and warehousing efficiency of finished products.

To achieve the above objectives, the present invention comprises the following technical solutions:

A dual pre-stacking system of steel plates for a single cutting line, characterized in comprising: a cooling bed inspection stand, a crop shear with a cut-to-length function, a bilateral shear, 1# inkjet printer, a front pre-stacker, a cut-to-length shear, a length and thickness gauge, 2# inkjet printer, surface check/size inspection and fitting, and a rear pre-stacker arranged in order along the roller way.

A dual pre-stacking system of steel plates for a single cutting line, characterized in comprising: a cooling bed inspection stand, a crop shear with a cut-to-length function, a bilateral shear, 1# inkjet printer, a front pre-stacker, a cut-to-length shear, a length and thickness gauge, 2# inkjet printer, surface check/size inspection and fitting, and a rear pre-stacker arranged in order and separated from each other along the roller way.

A stacking method by using a dual pre-stacking system of steel plates for a single cutting line, characterized in using the dual pre-stacking system of steel plates for a single cutting line according to claim 1 or 2, wherein the stacking method comprises the following steps:

1) inspecting a surface of a rolled steel plate on a cooling bed inspection stand, and meanwhile, locating the steel plate at an outlet of the cooling bed inspection stand before feeding it along the roller way into an inlet of a crop shear, wherein the steel plates include a raw edge steel plate and a width-direction trimmed steel plate;

2) when there are less than two steel plates to be cut at a cut-to-length shear, using a crop shear with a cut-to-length function to perform a head and tail end cutting and segmentation on the steel plates according to the normal procedure; and when there are no less than two steel plates to be cut at a cut-to-length shear, using the crop shear to perform a cut-to-length cutting on the steel plates;

3) passing the raw edge steel plate directly through a bilateral shear, and using the bilateral shear to perform the bilateral cutting on the width-direction trimmed steel plate;

4) inspecting a surface quality and shape of the steel plate which is cut to length by the crop shear at the bilateral shear, wherein if there are the problems on plate shape and quality, the steel plate is not to be pre-stacked; and, there is no need to inspect the steel plate which is segmented but not cut to length by the crop shear;

5) inkjet printing/imprinting the steel plate which is qualified for four-edge cut along the roller way at the outlet of the bilateral shear;

6) after completing the inkjet printing/imprinting, using a front pre-stacker to perform pre-stacking operation on the steel plates with qualified surface quality, size and plate shape along the roller way at the outlet of the bilateral shear and the inlet of the cut-to-length shear; and 7) arranging the steel plates after the pre-stacking operation at rear of the steel plates to be cut at the cut-to-length shear, and passing them directly through the cut-to-length shear, surface check/size inspection and fitting for warehousing after the steel plates ahead are cut.

Preferably, when there are two steel plates finished for pre-stacking at the cut-to-length shear, the head and tail end cutting and segmentation is performed on the steel plates at the crop shear according to the normal procedure, without performing the cut-to-length operation, and the operation of step 2) is not repeated until there are no less than three steel plates to be cut at the cut-to-length shear again.

BENEFICIAL EFFECTS

1) The present invention solves the bottleneck problems on inkjet printing and pre-stacking of using a cutting line to cut steel plates with multiple magnifications (more than 5)

by using a dual pre-stacking method for a cutting line, and improves cut and warehousing ability.

2) The cutting capacity of a single cutting line for heavy plates cannot meet the requirement on capacity of a heavy plate mill at all, and particularly, the cutting ability on steel plates with high magnification is significantly insufficient, while the present solution can significantly improve the productivity of a steel plate with multiple magnifications for a cutting line of a heavy plate, and the overall warehousing efficiency can be estimated to be improved by 30-50%.

BRIEF DESCRIPTION OF THE DRAWINGS

These and other features, properties and advantages of the present invention will become more apparent when the following detailed description of the disclosure is read with reference to the accompanying drawings and examples, and the same reference signs in the drawings always refer to the same features, in which:

FIG. 1 is a schematic view of the inventive examples.

DETAILED DESCRIPTION

To make the above objects, features and advantages of the present invention be more obvious and apparent, the following detailed description of the disclosure is read with reference to the accompanying drawings.

Now, the following detailed description of the inventive examples is read with reference to the accompanying drawings. The preferred examples will be detailedly referred and illustrated in the drawings. In any event, the same reference signs in all drawings always refer to the same or similar components.

Furthermore, although the terms used in the present invention are selected from the common terms, some terms mentioned in the description of the present invention may be selected according to the applicant's judgment, and the detailed explanation thereof will be described in the relevant disclosure herein.

Moreover, it is required that the invention be understood not only by the actually used terms, but also by the meaning contained therein.

Referring to FIG. 1, a dual pre-stacking system of steel plates for a single cutting line of the present invention comprises: a cooling bed inspection stand 1, a crop shear 2 with a cut-to-length function, a bilateral shear 3, 1# inkjet printer 4, a front pre-stacker 5, a cut-to-length shear 6, a length and thickness gauge 7, 2# inkjet printer 8, surface check/size inspection and fitting 9, and a rear pre-stacker 10 arranged in order along the roller way. Preferably, these parts are arranged separately from each other.

A stacking method by using a dual pre-stacking system of steel plates for a single cutting line of the present invention comprises the following steps:

1) inspecting a surface of a rolled steel plate on a cooling bed inspection stand 1, and meanwhile, locating the steel plate at an outlet of the cooling bed inspection stand 1 before feeding it into an inlet roller way of a crop shear 2, wherein the steel plates include a raw edge steel plate and a width-direction trimmed steel plate;

2) when there are less than two steel plates to be cut at a cut-to-length shear 6, using a crop shear 2 with a cut-to-length function to perform a head and tail end cutting and segmentation on the steel plates according to the normal procedure; and when there are no less than two steel plates to be cut at a cut-to-length shear 6, using the crop shear 2 to perform a cut-to-length cutting on the steel plate;

3) passing the raw edge steel plate directly through a bilateral shear 3, and using the bilateral shear 3 to perform the bilateral cutting on the width-direction trimmed steel plate;

4) inspecting a surface quality and shape of the steel plate which is cut-to-length by the crop shear 2 at the bilateral shear 3, wherein if there are the problems on plate shape and quality, the steel plate is not to be pre-stacked; and, there is no need to inspect the steel plate which is segmented but not cut to length by the crop shear 2;

5) inkjet printing/imprinting the steel plate which is qualified for four-edge cut along the roller way at the outlet of the bilateral shear 3;

6) after completing the inkjet printing/imprinting, using a front pre-stacker 5 to perform pre-stacking operation on the steel plates with qualified surface quality, size and plate shape along the roller way at the outlet of the bilateral shear 3 and the inlet of the cut-to-length shear 6; and 7) arranging the steel plates after the pre-stacking operation at rear of the steel plates to be cut at the cut-to-length shear 6, and passing them directly through the cut-to-length shear 6, surface check/size inspection and fitting 9 for warehousing after the steel plates ahead are cut.

Preferably, when there are two steel plates finished for pre-stacking at the cut-to-length shear 6, the head and tail end cutting and segmentation is performed on the steel plates at the crop shear 2 according to the normal procedure, without performing the cut-to-length operation, and the operation of step 2) is not repeated until there are no less than three steel plates to be cut at the cut-to-length shear 6 again.

EXAMPLES

1) There were no less than three steel plates to be cut at the cut-to-length shear 6 (for example, 29719437100, 29719437300 and 29719437500 were to be cut at the cut-to-length shear 6).

2) The incoming material, 42 m steel plate, was cut-to-length at the crop shear 2 into four sub-plates with a length of 10 m (for example, 29719438100, 29719438200, 29719438300 and 29719438300).

3) These four sub-plates were bilaterally cut by the bilateral shear 3 into a width of 3000 m.

4) After the operation of bilateral shear 3, 1# inkjet printer 4 was used to perform inkjet printing/imprinting operation on these four sub-plates, and meanwhile, the qualification of three steel plates among which is inspected for size, surface quality and shape, so as to perform size fit operation; and, one unqualified steel plate was subjected to an additional rescue process such as grinding, cold correction or additional fire cutting (for example, 29719438100, 29719438200 and 29719438300 were finished for size fitting; and, 29719438300 was subjected to additional cold correction).

5) A front pre-stacker 5 arranged after the inkjet printer was used to inspect the three qualified steel plates before automatically pre-stacking the steel plates, and the unqualified steel plate was passed directly through the pre-stacker to wait before the cut-to-length shear 6.

6) The pre-stacked steel plates which had been cut into the finished products and the finished steel plate that had been subjected to the additional process(s) (after cut at the cut-to-length shear 6) were automatically passed through the cut-to-length shear 6.

7) The steel plates which had been cut to length at the cut-to-length shear 6 were fed directly to 1JC for inkjet printing and size fitting inspection, wherein the qualified steel plates were fed directly to the pre-stacker 10 after 1JC, and the unqualified steel plates were rescued by the additional rescue processes such as offline grinding and fire cutting, or transferred to cold correction for flattening and the like.

8) Steel plate 29719438300 that was subjected to additional cold correction was passed directly through 1JC before transferring the lateral stand to the cold correction, and the three pre-stacked steel plates (29719438100, 29719438200 and 29719438300) were passed directly through 1JC and the rear pre-stacker 10 for warehousing operation.

Although the specific embodiments of the present invention have been described, those skilled in the art will understand that these are just illustrative, and the protection scope of the present invention is defined by the accompanying claims. Various changes or modifications to the invention can be made by those skilled in the art after reading the above teachings of the invention, and these equivalent variations fall in the scope defined by the accompanying claims of the application as well.

What is claimed is:

1. A stacking method using a dual pre-stacking system of steel plates for a single cutting line comprises the following steps:
    1) providing a dual pre-stacking system comprising: a cooling bed inspection stand, a crop shear with a cut-to-length function, a bilateral shear, a first inkjet printer, a front pre-stacker, a cut-to-length shear, a length and thickness gauge, a second inkjet printer, surface check/size inspection and fitting, and a rear stacker arranged in order and/or separated from each other along the roller way;
    2) inspecting a surface of a rolled steel plate on a cooling bed inspection stand, and meanwhile, locating the steel plate at an outlet of the cooling bed inspection stand before feeding it along the roller way into an inlet of a crop shear, wherein the steel plates include a raw edge steel plate and a width-direction trimmed steel plate;
    3) when there are less than two steel plates to be cut at a cut-to-length shear, using a crop shear with a cut-to-length function to perform a head and tail end cutting and segmentation on the steel plates according to the normal procedure; and when there are no less than two steel plates to be cut at a cut-to-length shear, using the crop shear to perform a cut-to-length cutting on the steel plates;
    4) passing the raw edge steel plate directly through a bilateral shear, and using the bilateral shear to perform the bilateral cutting on the width-direction trimmed steel plate;
    5) inspecting a surface quality and shape of the steel plate which is cut to length by the crop shear at the bilateral shear, wherein if there are the problems on plate shape and quality, the steel plate is not to be pre-stacked; and, there is no need to inspect the steel plate which is segmented but not cut to length by the crop shear;
    6) inkjet printing/imprinting the steel plate which is qualified for four-edge cut along the roller way at the outlet of the bilateral shear;
    7) after completing the inkjet printing/imprinting, using a front pre-stacker to perform pre-stacking operation on the steel plates with qualified surface quality, size and plate shape along the roller way at the outlet of the bilateral shear and the inlet of the cut-to-length shear; and
    8) arranging the steel plates after the pre-stacking operation at rear of the steel plates to be cut at the cut-to-length shear, and passing them directly through the cut-to-length shear, surface check/size inspection and fitting for warehousing after the steel plates ahead are cut.

2. The stacking method according to claim 1, wherein when there are two steel plates finished for pre-stacking at the cut-to-length shear, the head and tail end cutting and segmentation is performed on the steel plates at the crop shear according to the normal procedure, without performing the cut-to-length operation, and the operation of step 3) is not repeated until there are no less than three steel plates to be cut at the cut-to-length shear again.

* * * * *